E. MAEDER.
BRUSH HANDLE.
APPLICATION FILED JAN. 29, 1909.
919,610.
Patented Apr. 27, 1909.
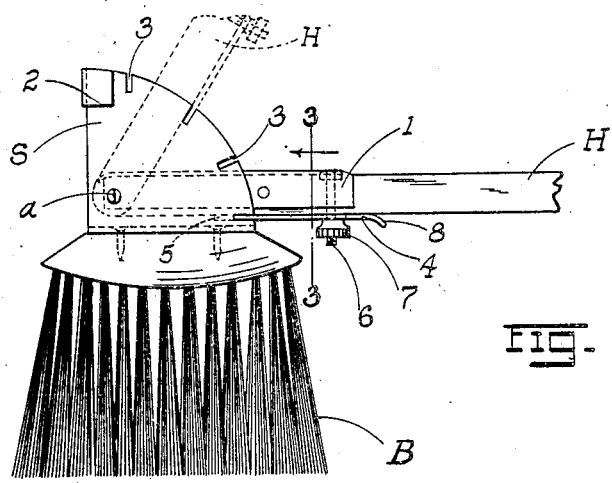
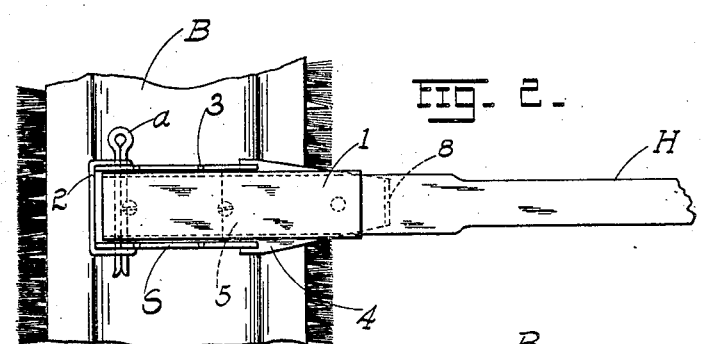
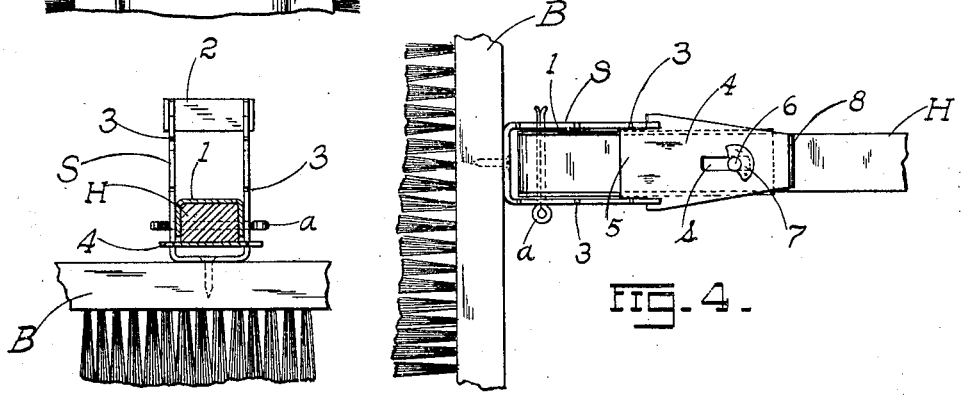
WITNESSES:
Harry A. Bennes
Jos. A. Michel
INVENTOR.
Edward Maeder·
BY Emil Starek
ATTORNEY.

UNITED STATES PATENT OFFICE.

EDWARD MAEDER, OF ST. LOUIS, MISSOURI.

BRUSH-HANDLE.

No. 919,610.  Specification of Letters Patent.  Patented April 27, 1909.

Application filed January 29, 1909. Serial No. 475,025.

*To all whom it may concern:*

Be it known that I, EDWARD MAEDER, citizen of the United States, residing at St. Louis, State of Missouri, have invented certain new and useful Improvements in Brush-Handles, of which the following is a full, clear, and exact description, reference being had to the accompanying drawings, forming a part hereof.

My invention has relation to improvements in brush-handles; and it consists in the novel details of construction more fully set forth in the specification and pointed out in the claim.

In the drawings, Figure 1 is a side elevation of my invention showing the brush in end view, and showing the handle in two distinct positions (one of them being shown in dotted lines); Fig. 2 is a view of the top of the brush and handle; Fig. 3 is a cross section on line 3—3 of Fig. 1; and Fig. 4 is a bottom view of the handle, with brush swung its full extent outwardly.

The present invention is specially applicable in connection with brushes, brooms, and the like intended for cleaning and sweeping floors, ceilings, walls, furniture and the like, and has for its object to provide a handle or rather a joint or connection between the handle and brush to enable the operator to reach into out of the way places like corners, on top of high pieces of furniture, ledges, and the like which can not be successfully accomplished by a brush fixed to one position on the handle.

The advantages of the invention will be best apparent from a detailed description thereof which is as follows:—

Referring to the drawings, B represents a conventional form of brush, and H a handle or stick therefor. To the back of the brush is secured a socket S, the same being formed with a bottom wall secured to the brush and with two side walls having edges curved in the arcs of circles concentric with the axis of oscillation of the handle H. The handle is pivoted between the side walls of the socket, being secured by a split pin $a$ by the removal of which the handle may be removed and renewed. The base of the handle within the socket is preferably protected by a shield or plate 1 as shown, the oscillation of the handle in one direction being limited by a bridge-piece 2 connecting the side-walls of the socket at the upper outer corners as shown. Formed along the curved edges of the side walls of the socket S are a series of slits or recesses 3 disposed radially to the arc of oscillation of the handle, the latter being provided with an adjustable locking plate 4 having an inner guiding tongue 5 operating between the socket walls. The terminal edge of the plate on each side of the base of the tongue engages the slits 3 thus locking the handle against oscillation, the slits on the two walls of the socket being in alinement so as to engage the opposite sides of the plate simultaneously. The plate is provided with an elongated opening $s$ through which passes a screw-threaded stem 6 which receives a nut 7 by which the plate may be clamped to the handle when inserted into any pair of slits 3. The outer end of the plate is provided with an outwardly-turned lip or flange 8 by which it may be manipulated. Upon the retraction of the plate 4 from any pair of slits 3, the handle H may be adjusted to any desirable angle with reference to the brush, and when so adjusted the plate is shoved into the slits or recesses which happen to be opposite thereto for such angular adjustment, and the handle is thus locked in its new position. Thus any angular adjustment may be effected between the handle H and the brush B, and the operator may thus use the brush to sweep or clean in corners and places otherwise inaccessible. As shown the brush may be rotated about the axis of the handle through an arc of not less than ninety degrees.

Having described my invention, what I claim is:—

In combination with a brush, a socket secured to the brush-back and provided with lateral walls having curved edges which are provided with a series of radial slits disposed along the edges, a handle pivoted between the walls of the socket, a locking plate on the handle adjustable to and from the socket and provided with an inner terminal guide tongue operating between the slotted walls of the socket, the inner end of the plate on either side of the base of the tongue being adapted to engage the slits in the socket walls, and means for clamping the plate to the handle.

In testimony whereof I affix my signature, in presence of two witnesses.

EDWARD MAEDER.

Witnesses:
EMIL STAREK,
JOS. A. MICHEL.